(12) United States Patent
Pan et al.

(10) Patent No.: US 10,267,142 B2
(45) Date of Patent: Apr. 23, 2019

(54) DOWNHOLE ELECTROMAGNETIC COMMUNICATIONS BETWEEN TWO WELLS

(71) Applicant: Schlumberger Technology Corporation, Sugar Land, TX (US)

(72) Inventors: Huicheng Pan, Katy, TX (US); Asif Khaleel, Calgary (CA); Erwann Lemenager, Houston, TX (US); Jaroslav Dobos, Fort Worth, TX (US); Sameer Bhoite, Conroe, TX (US); Michael Bladon, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/413,457

(22) Filed: Jan. 24, 2017

(65) Prior Publication Data
US 2017/0218750 A1 Aug. 3, 2017

Related U.S. Application Data

(60) Provisional application No. 62/289,778, filed on Feb. 1, 2016.

(51) Int. Cl.
*E21B 47/22* (2012.01)
*E21B 47/022* (2012.01)
*G01V 3/24* (2006.01)

(52) U.S. Cl.
CPC .......... *E21B 47/02216* (2013.01); *G01V 3/24* (2013.01)

(58) Field of Classification Search
CPC ................................................ E21B 47/02216
See application file for complete search history.

(56) References Cited

U.S. PATENT DOCUMENTS

| 5,485,089 A | 1/1996 | Kuckes |
| 5,923,170 A * | 7/1999 | Kuckes ............. E21B 47/02216 175/45 |
| 6,296,066 B1 * | 10/2001 | Terry .......................... E21B 4/18 138/125 |
| 8,063,641 B2 | 11/2011 | Clark et al. |
| 2010/0000728 A1 * | 1/2010 | O'Keefe ............... E21B 49/082 166/173 |
| 2012/0061143 A1 * | 3/2012 | Hay .................. E21B 47/02216 175/57 |
| 2017/0074087 A1 * | 3/2017 | Donderici ................. E21B 7/04 |

FOREIGN PATENT DOCUMENTS

WO  WO 2016108857 A1 *  7/2016  ............... E21B 7/04

* cited by examiner

*Primary Examiner* — Amine Benlagsir

(57) ABSTRACT

A method for conducting survey measurements in a ranging operation between a first well and a second well include generating an electromagnetic field in a downhole location in the first well and scanning for the electromagnetic field in a downhole location in the second well. When at least one characteristic of the electromagnetic field is detected, the method includes automatically initiating survey measurements for a ranging operation without receiving a downlink command from surface.

13 Claims, 7 Drawing Sheets

DOWNHOLE ELECTROMAGNETIC COMMUNICATIONS BETWEEN TWO WELLS

CROSS REFERENCE TO RELATED APPLICATION

This application claims priority to and the benefit of U.S. Provisional Patent Application No. 62/289,778, filed on Feb. 1, 2016, the entirety of which is incorporated herein by reference.

BACKGROUND

In some oil and gas drilling operations, wells may be drilled relatively close to each other. For example, Steam Assisted Gravity Drainage (SAGD) is a procedure for recovering heavy crude oil from bitumen reservoirs. Two horizontal wells are drilled into a reservoir zone wherein one well ("upper wellbore" or "injector well") is placed a few meters above the other ("lower wellbore" or "producer well"), in the order of about 5 meters. Steam is injected into the upper wellbore to heat heavy bitumen between the two wellbores thereby causing the bitumen to drain into the lower wellbore for recovery.

The lower wellbore is typically drilled and cased first. Then, the upper wellbore has to be drilled to extend in parallel to the lower wellbore. While drilling the upper wellbore it is important to monitor the distance between the two wellbores so that upper wellbore may be steered to ensure that the distance remains constant between the two wellbores. Due to the cumulative survey error and positioning uncertainty, an inclination error of 0.1° or 0.2° could lead to a few meters of true vertical depth (TVD) error and an Azimuth error of 1° could lead to 3 to 5 meters of error at the end of the build and 10 meters at the end of the horizontal section. As a result, it is known to employ techniques such as ranging to assist in positioning the two wellbores accurately with respect to one another.

Ranging techniques include passive ranging and active ranging. In active ranging, an EM source is deployed in one wellbore and the emitted electromagnetic field is measured in the other wellbore. The distance between the two wellbores may be derived from the respective amplitudes of the transmitted electromagnetic field in one wellbore and the measured electromagnetic field in the other wellbore. U.S. Pat. No. 8,063,641 to Schlumberger Technology Corporation discloses an active ranging method which uses a pair of electromagnetic field sources in wireline equipment deployed into the lower wellbore, and an electromagnetic field sensor in a bottom hole assembly (BHA) of a drill string in the upper wellbore. The BHA includes a measurement-while-drilling (MWD) subsystem that makes measurements, process and stores information, and includes a telemetry subsystem for data and control communication with the earth's surface using known telemetry techniques, including wireless techniques like mud pulse (pressure) telemetry, EM telemetry, acoustic telemetry and wired drill pipe. The telemetry subsystem may thus transmit MWD data as well as ranging data to surface via wireless or wired drill pipe telemetry.

Operation of the electromagnetic field sensor to detect the electromagnetic fields and the MWD subsystem to take ranging surveys is controlled and synchronized from the surface. Since there is typically no direct electrical connection between the BHA and the surface, commands sent from the surface are typically transmitted wirelessly to the BHA, e.g. via an EM or other type of downlink signal. Wireless telemetry techniques face a number of techniques challenges for transmitting data between the BHA and the surface, including: increasing signal attenuation with increasing depth, decreasing data speed with increasing depth, increasing energy requirements to transmit the wireless signal with increasing depth, and signal interference caused by surface and other background noise.

While data rates tend be higher using wired drill pipe telemetry compared to wireless telemetry, the drilling operation is limited to the use of very specific drill pipe, i.e., drill pipe having a compatible network of communications wiring. Since conventional drill pipe cannot be used with wired drill pipe telemetry, using wired drill pipe to telemeter data to and from the surface reduces flexibility and potentially increases operating costs.

SUMMARY

According to aspects of the disclosure, a method for conducting survey measurements in a ranging operation between a first well and a second well includes generating an electromagnetic field in a downhole location in the first well and scanning for the electromagnetic field in a downhole location in the second well. When at least one characteristic of the electromagnetic field is detected, survey measurements are automatically initiated for a ranging operation without receiving a downlink command from surface. In some embodiments, the first well may be a producer well in a steam assisted gravity drainage (SAGD) well pair, and the second well may be an injector well in the SAGD well pair.

Generating the electromagnetic field may include generating a positive polarity DC electromagnetic field, or generating a negative polarity DC magnetic field, or generating both positive and negative polarity DC electromagnetic fields. In some embodiments, the at least one characteristic of the electromagnetic field is amplitude. When generating only a positive polarity DC electromagnetic field, the automatic initiation of survey measurements occurs when the detected electromagnetic field meets an upper trigger threshold having a positive value that is met when the positive polarity DC magnetic field amplitude is equal to or greater than the upper trigger threshold. When generating only a negative polarity DC electromagnetic field, the automatic initiation of survey measurements occurs when the detected electromagnetic field meets a lower trigger threshold having a negative value that is met when the negative polarity DC electromagnetic field amplitude is equal to or below the lower trigger threshold. When generating both a positive and negative polarity DC electromagnetic field, the automatic initiation of survey measurements occurs when the detected electromagnetic field meets a defined trigger threshold including an upper trigger threshold having a positive value that is met when the positive polarity DC electromagnetic field amplitude is equal to or greater than the upper trigger threshold, and a lower trigger threshold having a negative value that is met when the negative polarity DC electromagnetic field amplitude is equal to or below the lower trigger threshold.

In some embodiments, two electromagnetic fields may be generated by two electromagnetic field sources that are spaced apart from each other in a direction along the first well.

According to aspects of the disclosure, an apparatus for conducting survey measurements in a ranging operation between a first well and a second well includes an electromagnetic ("EM") field emitter in a first well and an EM field detector in the second well. The EM field emitter is communicatively and electrically coupled to surface equipment by a wireline cable. Electronic circuitry is included in the second well to communicate with the EM field detector. The electronic circuitry includes a processor and a memory with a program to perform a method including: scanning for an electromagnetic field generated by the EM field emitter, and when the electromagnetic field is detected and has a value that meets a defined trigger threshold, automatically initiating survey measurements for a ranging operation without receiving a downlink command from surface. The EM field detector may include a three-axis flux gate magnetometer. The EM field emitter may include at least one solenoid, and for example may include a pair of solenoids spaced apart from each other along a wireline tool. The pair of solenoids may each be operable to generate positive and negative polarity DC EM fields.

According aspects of the disclosure, a method for communicating between a first well and a second well includes encoding data into a telemetry signal and generating an electromagnetic ("EM") field representing the telemetry signal in a downhole location in the first well and, scanning for the EM field in a downhole location in the second well and when the EM field is detected in the downhole location in the second well, receiving the telemetry signal at the downhole location in the second well and then transmitting the telemetry signal to surface using a wireline cable. The first well may be an injector well of a steam assisted gravity drainage (SAGD) well pair and the second well may be a producer well of the SAGD well pair. The method may further include drilling the injector well and conducting measurements while drilling, then encoding the measurements as the data into the telemetry signal. The EM field representing the telemetry signal may be generated by an EM field emitter of a measurement-while-drilling tool, or by an EM field emitter of an at-bit inclination and gamma ray services (PZiG) tool. The received telemetry signal may be digitized at the downhole location in the second well and the digitized telemetry signal may be transmitted to the surface using the wireline cable for decoding at surface. In some embodiments, the telemetry signal may be decoded at the downhole location in the second well, and a digitized decoded telemetry signal may be transmitted to the surface using the wireline cable.

According to aspects of the disclosure, an apparatus for communicating between a first well and a second well includes a bottom hole assembly for use in the first well and a wireline tool for use in the second well. The bottom hole assembly is coupled to a drill string, and includes an electromagnetic ("EM") field emitter and electronic circuitry communicative with the EM field emitter and which includes a processor and a memory having a program to perform a method including: encoding data into a telemetry signal and causing the EM field emitter to generate an EM field representing the telemetry signal. The wireline tool is coupled to a wireline cable extending to surface, and includes an EM field detector and electronic circuitry communicative with the EM field detector. The electronic circuitry includes a processor and a memory having a program to perform a method including scanning for the EM field and when the EM field is detected, receiving the telemetry signal and then transmitting the telemetry signal to surface via the wireline cable. The electronic circuitry may be communicative with the EM field detector, and may further include an analog-to-digital converter operable to digitize the telemetry signal such that a digitized telemetry signal is transmitted to surface via the wireline cable. The electronic circuitry may further include a decoder operable to decode the telemetry signal such that a decoded and digitized telemetry signal is transmitted to surface via the wireline cable.

In some embodiments, the first well may be an injector well of a steam assisted gravity drainage (SAGD) well pair and the second well may be a producer well of the SAGD well pair, in which case the bottom hole assembly further includes measurement-while-drilling ("MWD") sensors communicative with the electronic circuitry to transmit MWD measurements to the electronic circuitry. The MWD measurements include at least part of the data for encoding into the telemetry signal. The bottom hole assembly may further include a measurement-while-drilling (MWD) tool wherein the EM field emitter is part of the MWD tool. In some embodiments, the bottom hole assembly may further include an at-bit inclination and gamma ray services (PZiG) tool, wherein the EM field emitter is part of the PZiG tool.

According to aspects of the disclosure, a method for communicating between a downhole location in a first well and a downhole location in a second well includes receiving data from the surface via a wireline extending from the surface to the downhole location in the first well, encoding the received data into an electromagnetic signal, then generating an electromagnetic field including the electromagnetic signal. In the downhole location in the second well, the electromagnetic field is received and decoded to obtain the data.

The data may include a command for an operation of a bottom hole assembly in the second well. The command may be selected from change a telemetry parameter, change a measurement type, and change a drilling parameter. When the command is to change a telemetry parameter, the telemetry parameter may be selected from modulation type, carrier frequency, and signal level. When the command is to a change measurement type, the measurement type may be selected from a survey measurement, a vibration measurement, an RPM measurement, a resistivity measurement, and a gamma measurement. When the command is to change a drilling parameter of a rotary steering system, the drilling parameter may be selected from inclination and azimuth.

DETAILED DESCRIPTION

According to some embodiments disclosed herein, an improved method and system for communicating between two closely spaced wells, such as between wells in a SAGD well pair is disclosed. For example, some embodiments described herein relate to a downhole communications method and system used during drilling of a SAGD well pair, and which includes at least one EM field emitter in one of a drill string BHA in an injector well or a wireline tool in a producer well, and an EM field detector in the other one of the drill string BHA or the wireline tool. However, it is to be understood that other embodiments of the downhole communications method and system may be used in downhole operations other than SAGD that include multiple wells in sufficiently close proximity to facilitate wireless EM communication between at least two wells. For example, other embodiments of the downhole communications method and system may be applied to pad drilling that include two relatively closely spaced wells.

In the embodiments used with a SAGD well pair, the downhole communications method and system utilizes short range EM communication means between the downhole equipment in the producer well and injector well, as well as wireline communications means between the wireline tool and the surface, and may be applied in a number of different downhole operations. For example, in some embodiments the downhole communications method and system may be used for ranging operations between the producer and injector wells, wherein ranging data is generated using measurements of EM transmissions between the BHA and wireline tool and the wireline tool transmits the ranging data to surface via a wireline cable that physically connects the wireline tool with surface wireline equipment. In some embodiments, the BHA may include MWD sensors and measurements taken by the MWD sensors are electromagnetically transmitted by an EM field emitter in the BHA and received by an EM field detector in the wireline tool and then transmitted to surface via the data cable. In some embodiments, the wireline tool includes at least one EM field emitter and the MWD tool includes an EM field detector and electronic equipment having a synchronization program that is executable to automatically detect an EM field generated by the EM field emitter and trigger a survey measurement without the need for the surface equipment to separately downlink with the MWD tool.

The short range EM communication between the downhole equipment in the producer well and injector well and the wireline communications between the wireline tool and the surface may provide a number of benefits over communicating wirelessly between downhole and surface, including one or more of: increased data rate transmission, reduced power requirements, improved-signal-to-noise ratio downhole compared to surface, and reduced hazards associated with the use of surface electrodes to detect EM signals at surface.

Figure 1:
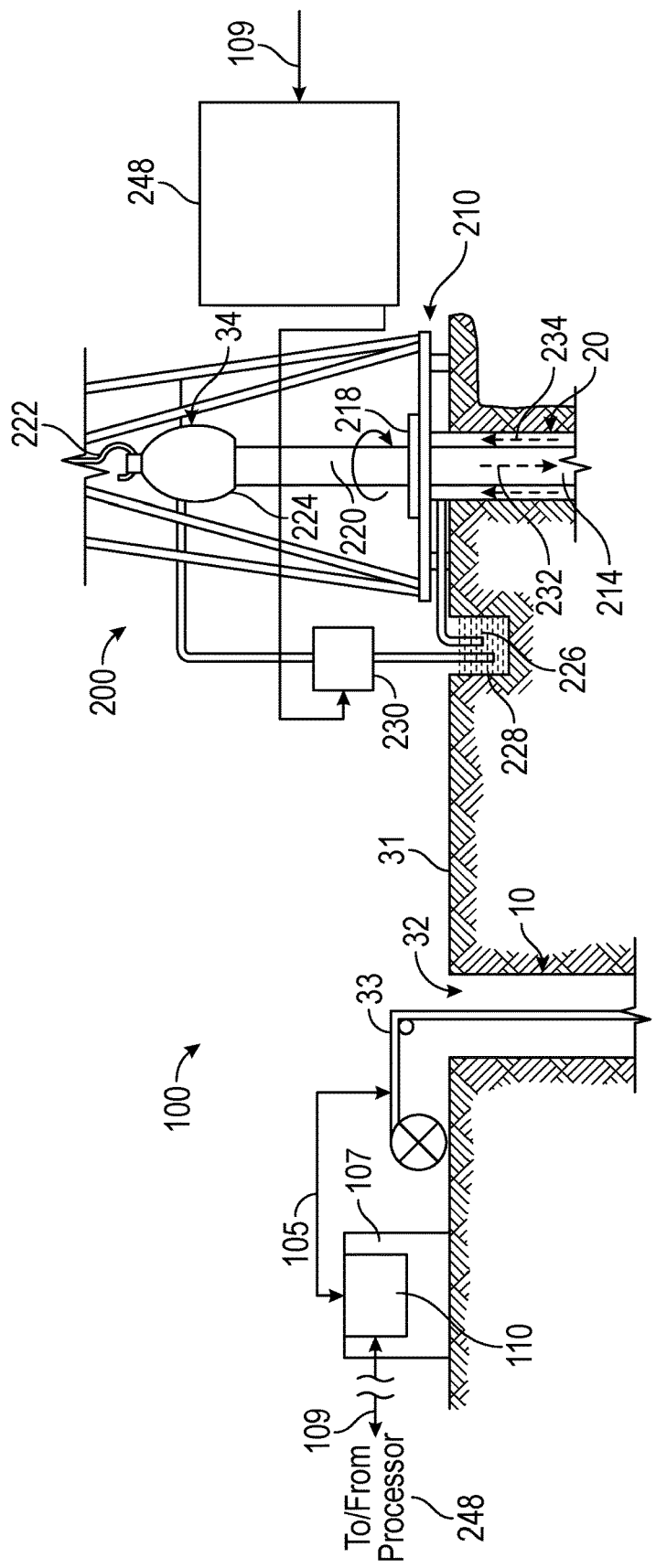
FIG. 1 is a schematic of surface equipment used in embodiments of the disclosure, including wireline equipment for use in a producer well and drilling equipment for use in a steam injector well.

FIG. 1 illustrates surface equipment of a type that may be used in practicing embodiments of the disclosure used in SAGD applications. Wireline surface equipment 100 operates in conjunction with the existing producer well 10 and surface drilling equipment 200 operates in conjunction with the well (otherwise referred to as "borehole") 20 being drilled and which, in this example, may ultimately be used as a steam injector well. In some embodiments, the wireline surface equipment may be used in a first well other than a producer well, and in applications other than SAGD, in conjunction with surface drilling equipment used to drill a second well other than a steam injector well, and in applications other than SAGD, provided that the first and second wells are close enough together to facilitate EM communications.

The wireline surface equipment 100 includes a wireline cable 33, the length of which substantially determines the relative depth of the downhole wireline tool in the producer well. The length of the wireline cable 33 is controlled by suitable means at the surface such as a drum and winch mechanism and includes a data cable for transmitting data between the wireline tool and the surface wireline equipment, and a power cable for transmitting electrical power to the wireline tool. The depth of the downhole wireline tool within the producer well may be measured by encoders in an associated sheave wheel, the double-headed arrow 105 representing communication of the depth level information and other signals to and/or from the surface equipment. Surface equipment, represented at 107, may be of conventional type, and may include a processor subsystem 110 and a recorder, and communicates with the downhole wireline tool. In the present embodiment, the processor 110 in surface equipment 107 communicates with a processor 248, which is associated with the drilling equipment. This is represented by double-headed arrow 109. It will be understood that the processors may include a shared processor, or that one or more further processors may be provided and coupled with the described processors.

The surface drilling equipment 200, which includes known measurement while drilling (MWD) capability, includes a platform and derrick 210 which are positioned over the borehole 20. A drill string 214 is suspended within the borehole 20 and includes a BHA which will be described further. The drill string 214 is rotated by a rotating table 218 (energized by means not shown) which engages a Kelly 220 at the upper end of the drill string 214. The drill string 214 is suspended from a hook 222 attached to a traveling block (not shown). The Kelly 220 is connected to the hook 222 through a rotary swivel 224 which permits rotation of the drill string 214 relative to the hook 222. In some embodiments, the drill string 214 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of drill string 214. The drilling fluid 226 exits the drill string 214 via ports in the drill bit and then circulates upward in the annulus between the outside of the drill string 214 and the periphery of the borehole 20, as indicated by the flow arrows 234. The drilling fluid 226 thereby lubricates the bit and carries formation cuttings to the surface of the earth. At the surface, the drilling fluid 226 is returned to the mud pit 228 for recirculation. In the present embodiment, a well known directional drilling assembly, with a steerable motor, is employed.

Figure 2:
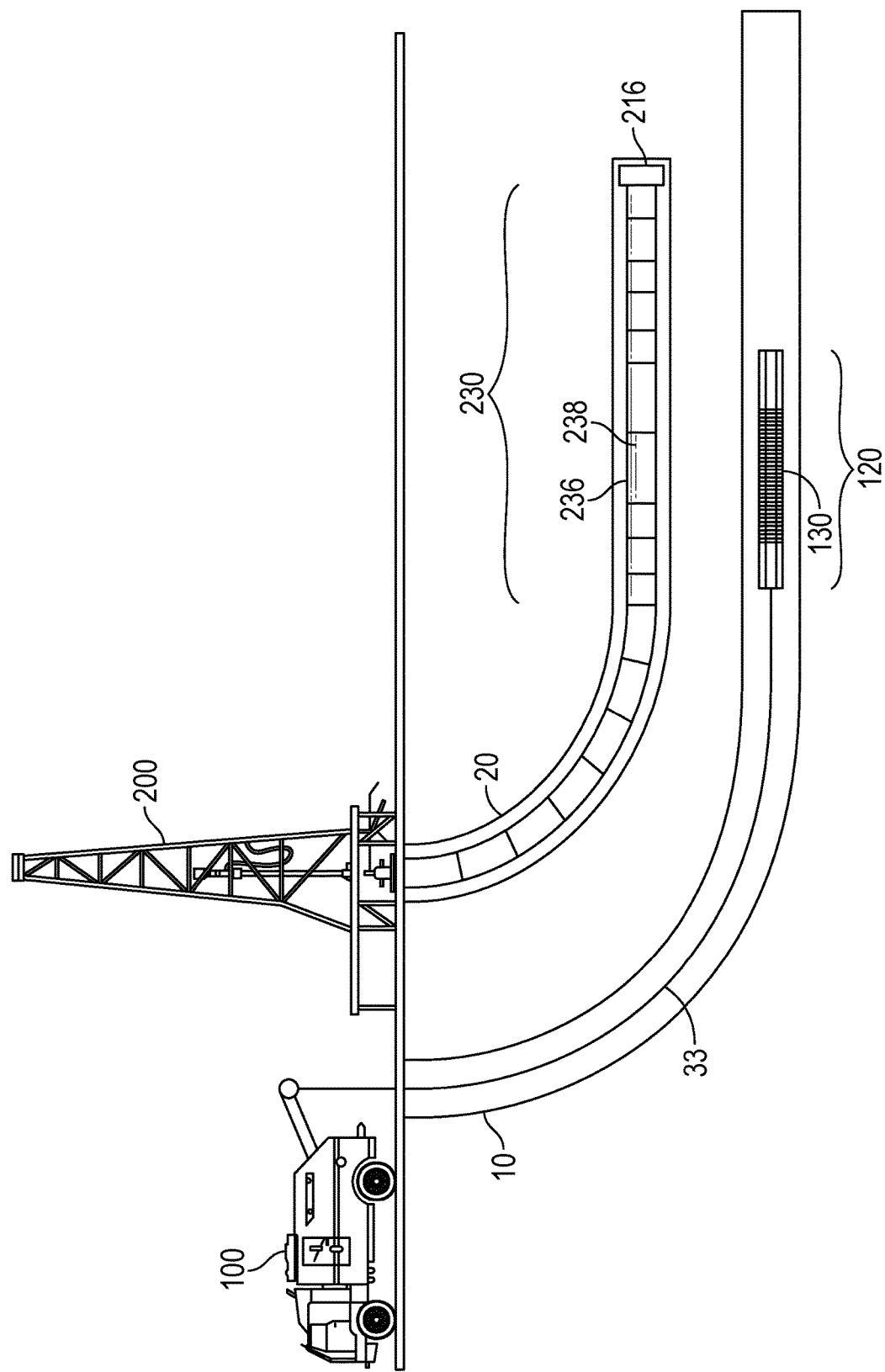
FIG. 2 is a schematic of downhole equipment used in embodiments of the disclosure, including a wireline tool in the producer well, and a drill string including a BHA with a downhole MWD tool in the injector well, wherein one of the wireline tool and MWD tool includes an EM field emitter, and the other of the wireline tool and the MWD tool includes an EM field detector.

As shown in FIG. 2, which shows downhole portions of producer and injector wells 10 and 20, mounted near a drill bit 216, is the BHA 230, which includes, inter alia, MWD subsystems, represented generally at 236 and referred to a "MWD tool", for making measurements, and processing and storing information. One of these subsystems, also includes an EM telemetry subsystem 238 for data and control communication with the wireline equipment 100. In some embodiments, the EM telemetry subsystem 238 includes an EM field detector configured to detect an EM field generated by one or more EM field emitters in the wireline tool. In other embodiments, the EM telemetry subsystem 238 includes an EM field emitter configured to generate an EM field for detection by an EM field detector in the wireline tool. In yet other embodiments, the EM telemetry subsystem includes both an EM field emitter and an EM field detector that enables two way communications with a corresponding EM field emitter and EM field detector in the wireline tool. The MWD tool 236 also includes acquisition sensors ("MWD sensors") and processing electronics (not separately shown) including a microprocessor system, with associated memory, clock and timing circuitry. Power for the downhole electronics and motors may be provided by battery and/or, as known in the art, by a downhole turbine generator powered by movement of the drilling fluid. A steerable motor (not shown) and under control from the surface via the downhole processor, is provided for directional drilling.

Optionally, the BHA 230 includes an at-bit inclination and gamma ray service (PZiG) tool 240 located directly behind the drill bit. The PZIG tool 240 includes an at-bit inclination and gamma ray service that provides real-time measurements that reduce directional drilling risk in critical hole sections. The early indication of changes in lithology, delivered by the gamma ray log, helps to accurately land horizontal wells.

FIG. 2 also shows a wireline tool 120 in the producer well 10. The wireline tool 120 includes an EM telemetry subsystem 130 which in some embodiments includes an EM field emitter having at least one solenoid, and in other embodiments includes an EM field detector, and in yet other embodiments includes both an EM field emitter and an EM field detector. In one embodiment, the wireline tool 120 may include a tractor (not shown) to convey the wireline assembly 120 along a long lateral section of the producer well, electrical connectors (not shown) to inter-connect a head of the wireline cable 33 to the tractor and the tractor to the EM field emitter and/or detector. The EM field emitter and detector may be constituted of one or more solenoids, made of a long core material with wires wound around it. The wires, wound around the core material, are energized from surface via the wireline cable 33 and induce an electromagnetic field when the solenoid is used as an EM field emitter. As an EM field detector, a varying magnetic field inside the solenoid will induce a current in the solenoid windings.

The MWD tool 236 and the wireline tool 120 may communicate wirelessly with each other using one or several types of electromagnetic wave propagation techniques to perform a number of different downhole operations as will be described below. In each embodiment, the data connection provided by the wireline cable 33 provides fast and reliable communication with the surface equipment and the wireline tool 120, and the EM telemetry subsystems in the MWD tool 236 and the wireline tool 120 provide an effective means for wireless short-range communication between the producer and injector wells.

Figure 3:
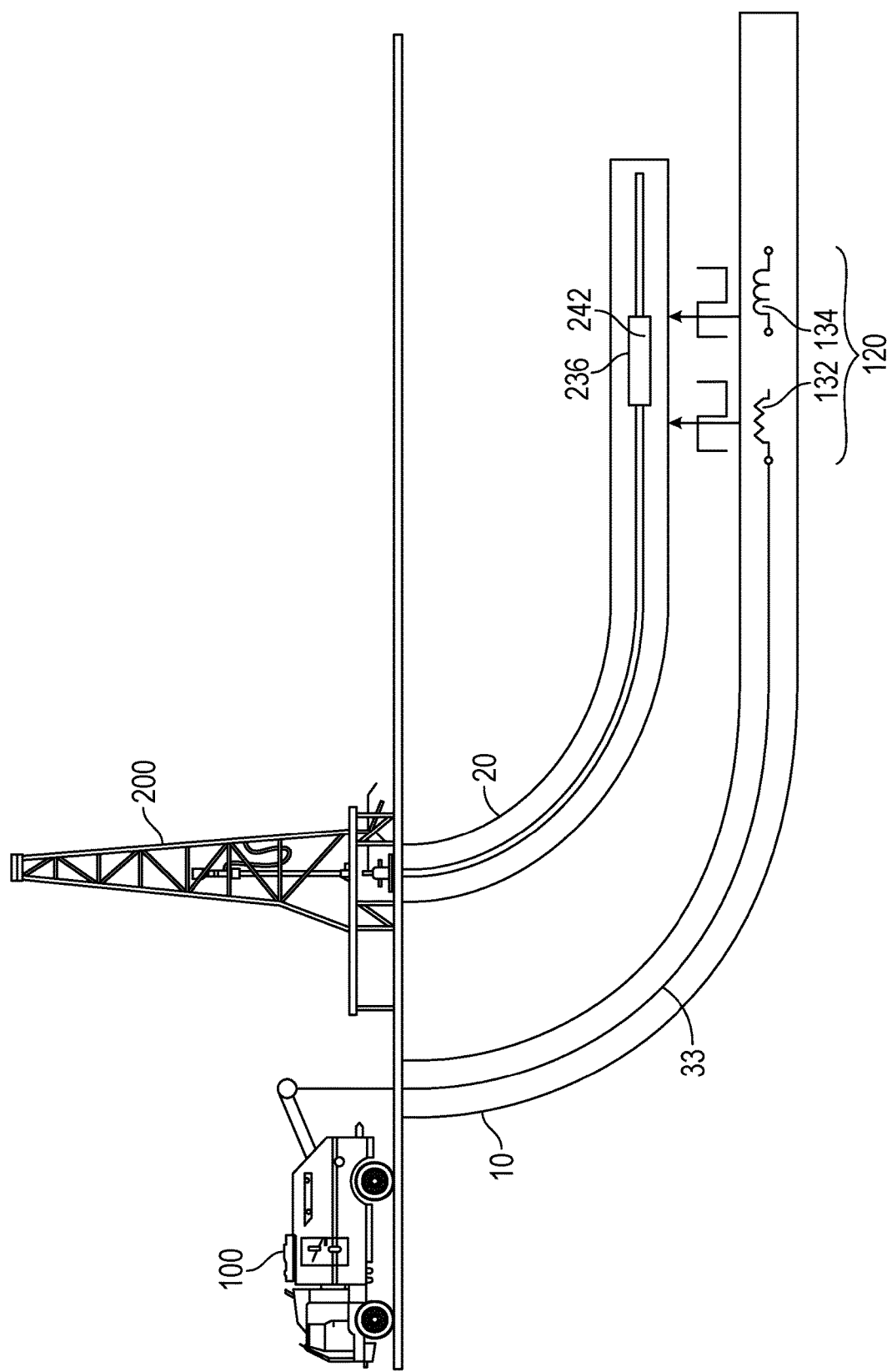
FIG. 3 is a schematic of downhole equipment used in one embodiment of the disclosure, wherein the wireline tool includes a pair of solenoid EM field emitters, and the MWD tool includes an EM field detector and electronic equipment programmed with a synchronization program that is executable to automatically detect an EM field emitted by the EM field emitters and trigger a survey operation.
Figure 4:
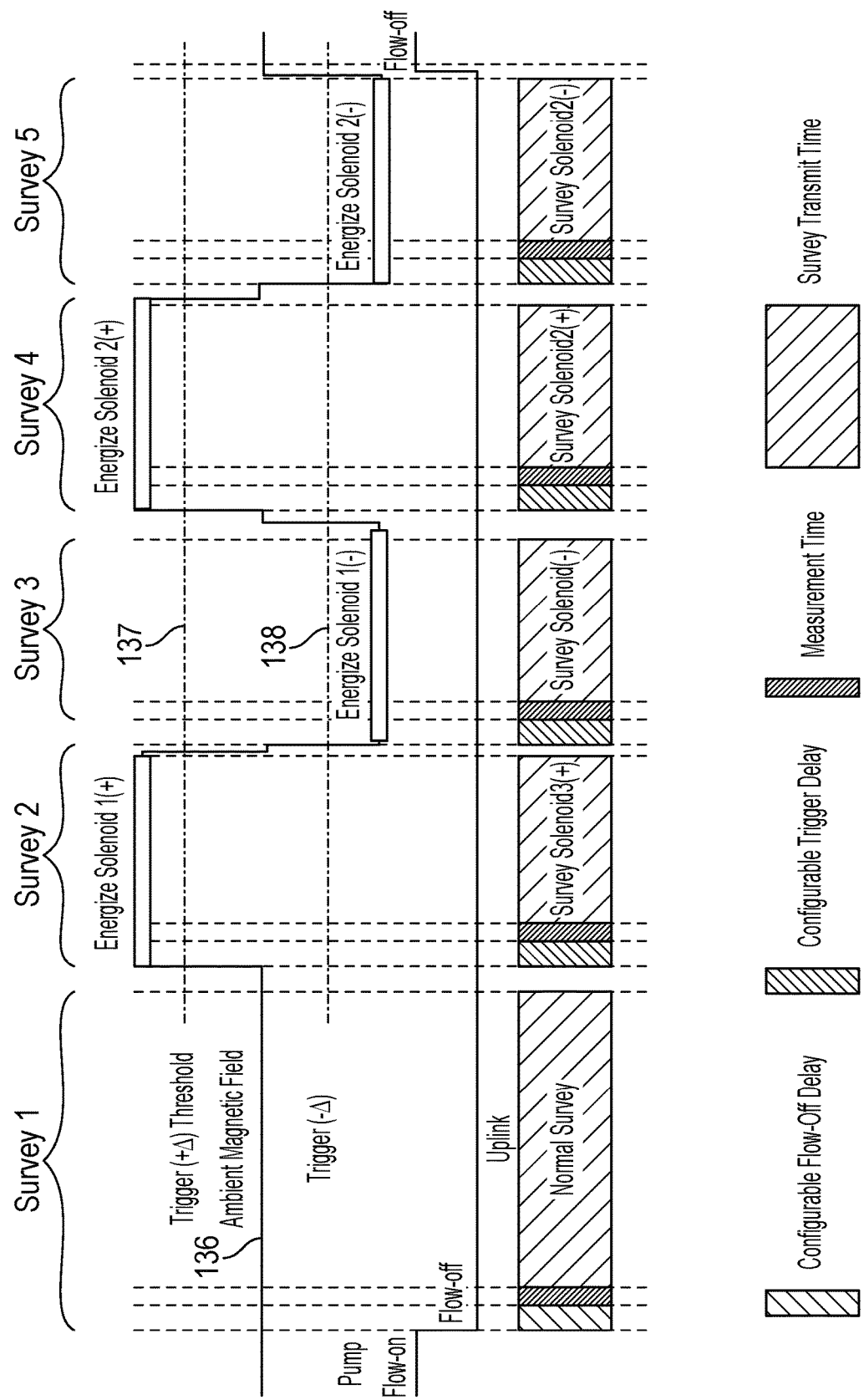
FIG. 4 is a schematic representation of a sequence of steps performed by the MWD tool when the synchronization program is executed.

According to a first embodiment and referring to FIGS. 3 and 4, the downhole communications method and system is used during a ranging operation wherein one or more electromagnetic fields generated by an EM field emitter in the wireline tool 120 are detected by an EM field detector in the MWD tool 236 using a synchronization method that automatically triggers a survey operation, i.e. without receiving a survey trigger command from surface via wireless downlink, such as via EM, flow, pressure, vibration or other known approaches.

The EM telemetry subsystem 130 of the wireline tool 120 includes an EM field emitter having one or more solenoids; in the embodiment shown in FIG. 3, the EM field emitter includes two solenoids ("first solenoid" 132 and "second solenoid" 134) which serve as electromagnetic field sources (DC or AC) and the EM telemetry subsystem 238 in the MWD tool 236 includes an EM field detector 242. The electromagnetic field sources in the wireline tool 120 will emit a pair of electromagnetic fields which may be detected by the EM field detector 242. The two solenoids 132, 134 in the wireline tool 120 are configured to respectively emit an electromagnetic field with positive and/or negative polarity, and are controlled from the surface through the data cable which also acts as an electrical cable to supply power to generate the electromagnetic fields.

The EM field detector 242 of the MWD tool 236 includes a three-axis flux gate magnetometer which is used to the detect electromagnetic fields generated by the two solenoids 132, 134. The two solenoids 132, 134 may generate a DC or an AC electromagnetic field. In this embodiment, the synchronization method is explained in the context of the solenoids emitting a DC field in a DC active ranging operation. It is however possible for the synchronization method to be modified to automatically detect an AC electromagnetic field signature or an AC electromagnetic synchronization pattern, in a manner that would be apparent to one skilled in the art in view of this description.

The MWD tool 236 further includes electronic circuitry that is programmed to carry out an "active ranging" technique which evaluates changes in the strength and other characteristics of the electromagnetic fields to estimate of the distance between the producer and injector wells 10, 20 (or between two closely spaced wells in another downhole operation (not shown)). An example of a known active ranging technique which may be employed by the MWD tool 236 is taught in U.S. Pat. No. 8,063,641 which is herein incorporated by reference.

The generation of the electromagnetic fields is triggered by a command from the wireline surface equipment 100, which is transmitted via the wireline cable 33 to the wireline tool 120. The operation of the EM field detector 242 in the MWD tool 236 needs to be synchronized with the electromagnetic field generation in a specified time sequence in order to measure and record the electromagnetic fields in the performance of the active ranging operation. Accordingly, the MWD tool 236 is also provided with electronic circuitry which is programmed with a synchronization program that when executed, automatically detects the electromagnetic fields and triggers a survey operation of the active ranging technique without the need to receive downlink instructions from the surface. Use of this synchronization program is expected to be more reliable and efficient than the down-linking solutions currently available in the art, and be utilized in SAGD and other applications where there is a requirement to drill two or more well bores close to one another.

The electronic circuitry programmed with the synchronization program may be a general purpose programmable computer, or a standalone controller such as a programmable logic controller (PLC). The electronic circuitry includes a processor and a non-transitory memory; the memory has encoded thereon program code embodying the synchronization program and executable by the processor to perform the synchronization method.

In the case of a DC active ranging operation, the MWD 236 will normally acquire a survey at the well site when the pumps are switched off. An operator will then send a command signal via the wireline cable 33 to the wireline tool 120 to energize the first and second solenoids 132, 134, which are configured to respectively emit a positive (+) DC electromagnetic field and a negative (−) DC electromagnetic field.

The MWD tool 236 operates the EM field detector 242 to continuously scan for a electromagnetic field generated by the wireline tool 120. Typically, the MWD field detector 242 (magnetometer) continuously scans for the magnetic field after the mud pumps or flow are off, e.g. when a drill pipe connection is made. The MWD tool 236 will detect first a flow off condition and then start scanning for an a specific signature that would correspond to a signal. When an electromagnetic field is detected, the MWD tool 236 executes the synchronization program and acquires three axis gravity and three axis electromagnetic field data from the detected electromagnetic field, and then conduct five surveys. These surveys are shown in FIG. 4, and are: background measurements (Survey 1), positive DC electromagnetic field measurements from first solenoid 132 (Survey 2), negative DC electromagnetic field measurements from first solenoid 132 (Survey 3), positive DC electromagnetic field from second solenoid 134 (Survey 4), and negative DC electromagnetic field from second solenoid 134 (Survey 5). This five survey sequence is only one example of a suitable synchronization sequence; other synchronization sequences may be possible under different circumstances, such as a different number of EM field emitters.

In the first survey, the EM field detector 242 (or in some embodiments, an EM MWD transceiver antenna such as a gap sub or a toroid) measures the background (ambient) gravity and EM field 136 and the MWD tool 236 transmits the measured values to the surface. The MWD tool 236 may include a telemetry subsystem that typically transmits a low frequency current into the earth formation. The low frequency current will travel to surface (and will be attenuated as it travels through the earth conductive layers). The ambient background electromagnetic field 136 is used as reference for the remaining surveys, and should be a value that is between a user defined upper trigger threshold 137 and lower trigger threshold 138. After transmitting the first survey, the MWD tool 236 starts scanning for electromagnetic field values at a defined frequency, e.g. every second.

When the first solenoid 132 in the wireline tool 120 emits a (+) DC electromagnetic field and the value of the electromagnetic field detected by EM field detector 242 is above the user defined upper trigger threshold 137, the MWD tool 236 takes the second survey and transmits the values to the surface.

When the first solenoid 132 in the wireline tool 120 emits a (−) DC electromagnetic field and the value of the electromagnetic field detected by the EM field detector 242 is below the user defined lower trigger threshold 138, the MWD tool 236 takes the third survey and transmits the value to the surface.

When the second solenoid 134 emits a (+) DC electromagnetic field and the value of the electromagnetic field detected by the detector 242 is above the upper trigger threshold 137, the MWD tool 236 takes the fourth survey and transmits the values to the surface.

When the second solenoid 134 emits a (−) DC electromagnetic field and the value of the electromagnetic field detected by the detector 242 is below the lower trigger threshold 138, the MWD tool 242 takes the fifth survey and transmits the value to the surface.

By automatically triggering execution of surveys 2 to 5 where the surveys are acquired after detection of the electromagnetic field above the upper trigger threshold 137 or below the lower trigger threshold 138, the need for the MWD tool 236 to downlink from surface is eliminated, and the challenges associated with synchronization of the measurement in the detector 242 and the excitation of the solenoids 132, 134 is removed.

As noted above, the EM telemetry subsystem 130 of the wireline tool 120 may include an EM field emitter having only one solenoid. In this embodiment, the synchronization program is modified to detect only one EM field produced by the one solenoid. In particular, the synchronization program may be modified to only carry out a different number of surveys, such as Surveys 1 to 3 as described above.

While the described embodiments of the synchronization program utilize amplitude threshold to detect an EM field, detection does not have to be with amplitude threshold. Some embodiments may utilize other approaches to detect the EM field; for example, synchronization may be based on patterns of + and − amplitude, and the synchronization program may detect the phase of the synchronization pattern or the frequency of the synchronization pattern.

As noted above, the electromagnetic field generated by the wireline tool 120 is a DC electromagnetic field used by the MWD tool 236 for ranging purposes. In some embodiments, the wireline tool 120 may be configured to generate an AC electromagnetic field that carries a command signal that may be received by the MWD tool 236. The wireline tool 120 is provided with electronic circuitry that may receive a command signal from surface via the wireline cable 33, encode the command signal into a telemetry signal that may be transmitted by one or both of the solenoids 132, 134 as an AC electromagnetic field carrier wave. Known modulation schemes such as amplitude shift keying (ASK), frequency shift keying (FSK) or phase shift keying (PSK) may be used to encode the measurement data into the telemetry signal. The telemetry tool 236 is provided with electronic circuitry communicative with the EM field detector 242 and is programmed with a demodulation scheme that corresponds with the modulation scheme used by the wireline tool 120. The command signal may include a request to the MWD tool 236 to start or stop a transmission of an EM transmission by the tool's telemetry subsystem or to change a configuration of the MWD tool 236, e.g. EM transmission parameters such as transmission frequency, signal amplitude, and transmitted data. The command signal may instruct the MWD tool 236 what to transmit including the structure of the message (e.g. what type of data: tool status, directional information, gamma information, drilling condition) and also the parameters of the transmission (e.g. modulation: type of modulation, frequency, amplitude, power, phase).

Figure 5:
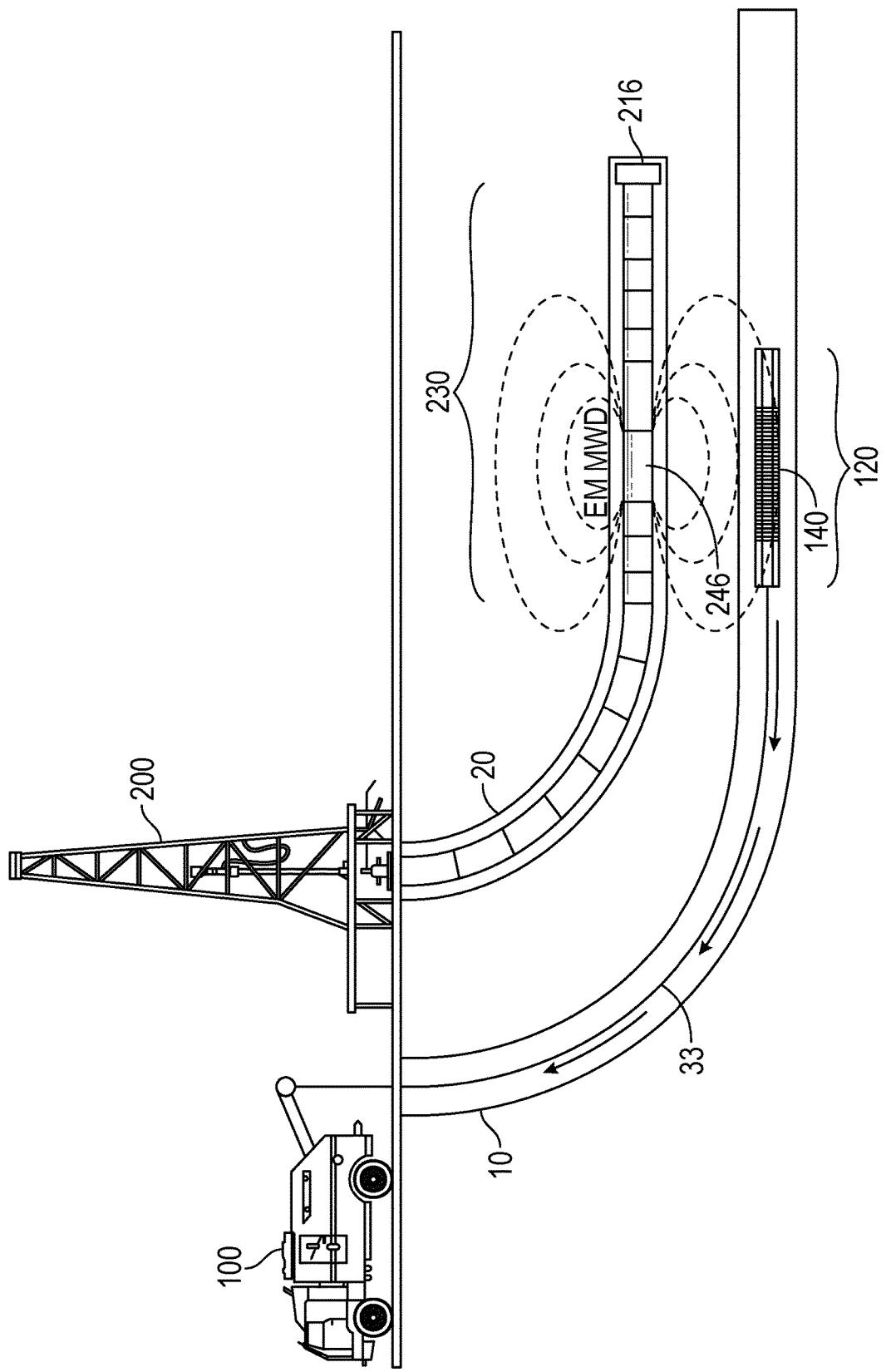
FIG. 5 is a schematic of downhole equipment used in another embodiment of the disclosure, wherein the MWD tool includes an EM field emitter and the wireline tool includes an EM field detector for detecting an EM signal emitted by the EM field emitter, and electronic equipment for processing the EM signal and transmitting ranging data by wireline to the surface.

Referring now to FIG. 5 and according to another embodiment, the MWD tool 236 is provided with an EM telemetry subsystem having an EM field emitter 246, and the wireline tool 120 is provided with an EM telemetry subsystem having an EM field detector 140. The MWD tool 236 is also provided with MWD sensors (not shown) and with electronic circuitry communicative with the MWD sensors and the EM field emitter 246, and which is programmed to convert measurements taken by the MWD sensors into measurement data and to encode the measurement data into a telemetry signal that may be transmitted by the EM field emitter 246 as an AC electromagnetic field carrier wave. Known modulation schemes such as ASK, FSK or PSK may be used to encode the measurement data into the telemetry signal. The wireline tool 120 is also provided with electronic circuitry communicative with the EM field detector 136 to receive an analog signal corresponding to the detected EM carrier wave, and to transmit this analog signal to surface via the data cable in the wireline. In some embodiments, the electronic circuitry is provided with an analog-to-digital (AD) converter module which converts the analog signal into a digital signal and then transmits the digital signal to surface via the data cable. In some embodiments, the electronic circuitry is provided with an AD converter module, a signal processing module and a demodulation module which respectively digitizes the detected analog signal, filters and applies other signal processing operations to the detected signal, and then decodes the detected signal using a demodulation scheme corresponding to the modulation scheme employed by the MWD tool 236. The digitized, processed and decoded signal is then transmitted to surface via the wireline cable 33.

Optionally, EM telemetry subsystem in the wireline tool 120 may also have one or both EM field emitters 132, 134 and the EM telemetry subsystem in the MWD tool 236 may also have the EM field detector 242 in which case the MWD tool 236 may be provided with electronic circuitry with the synchronization program that operates to automatically trigger active ranging survey operations in the manner discussed above.

Figure 6:
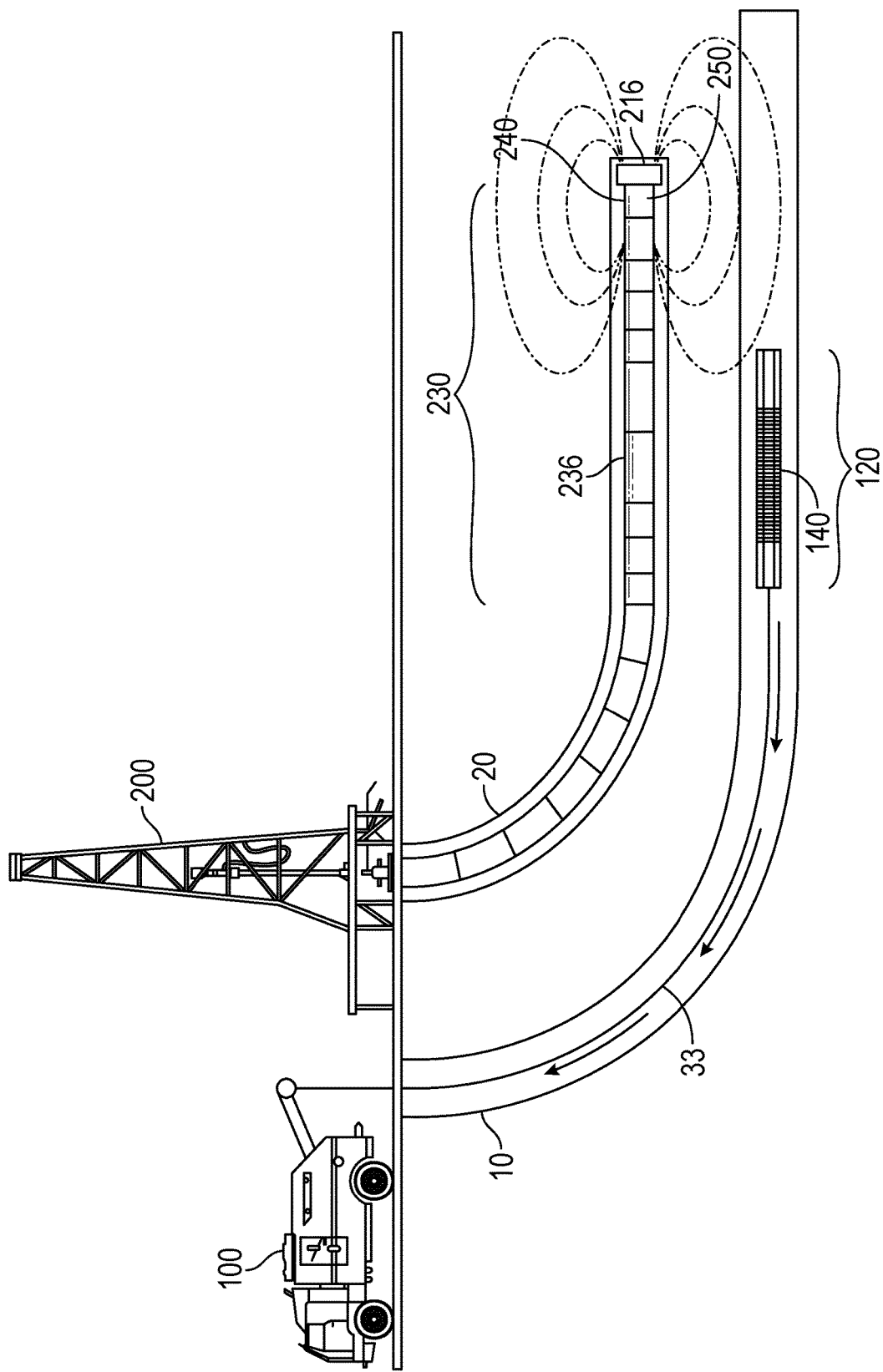
FIG. 6 is a schematic of downhole equipment used in another embodiment of the disclosure, wherein the BHA includes an at-bit inclination and gamma ray service (PZiG) tool with an EM field emitter, and the wireline tool includes an EM field detector for detecting an EM signal emitted by the EM field emitter, and electronic equipment for processing the EM signal and transmitting ranging data by wireline to the surface.

Referring now to FIG. 6 and according to another embodiment, the PZiG tool 240 includes an EM field emitter 250 and may be communicative with the electronic circuitry in the embodiment of the MWD tool 236 shown in FIG. 5, or have its own electronic circuitry to encode measurement data into a telemetry signal for transmission as a electromagnetic field carrier wave by the EM field emitter 250. The wireline tool 120 in this embodiment is provided with the EM field detector 140 and electronic circuitry of the embodiment shown in FIG. 5 to detect the carrier wave and decode and/or transmit the measurement data to surface.

Figure 7:
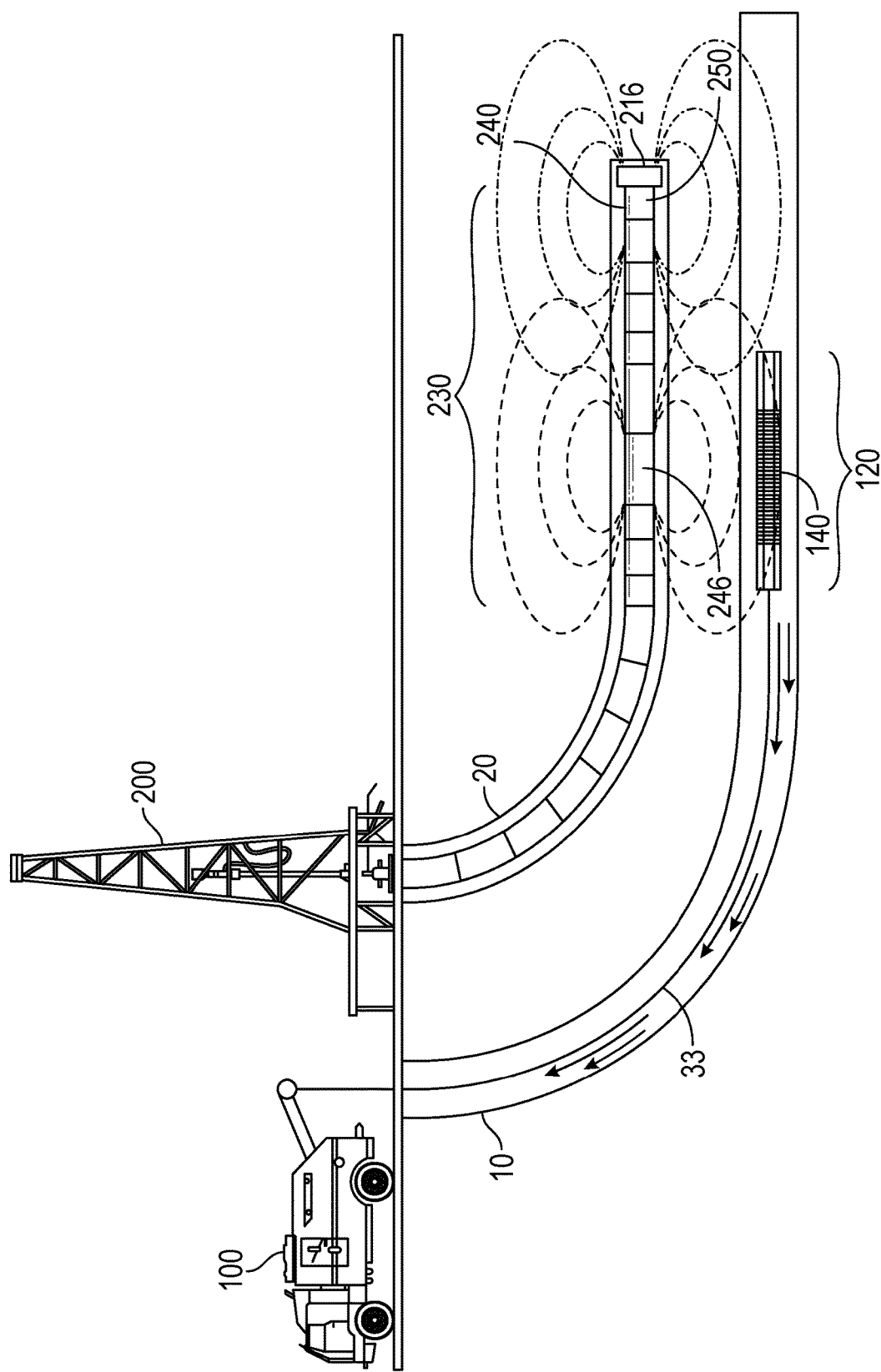
FIG. 7 is a schematic of downhole equipment used in another embodiment of the disclosure, wherein the BHA includes an MWD tool with a first EM field emitter and a PZiG tool with a second EM field emitter, and the wireline tool includes an EM field detector for detecting EM signals emitted by the first and second EM field emitters, and electronic equipment for processing the EM signals and transmitting ranging data by wireline to the surface.

Referring now to FIG. 7 and according to yet another embodiment, the MWD tool 236 and PZiG tool 240 are both provided with EM field emitters 246, 250 that together generate two electromagnetic fields carrying two different signals, which propagate through the earth and are detected by the wireline tool 120, which has the EM field detector 136 and electronic circuitry of the embodiments shown in FIGS. 5 and 6. The PZiG tool 240 and MWD tool 236 may be configured to transmit their respective electromagnetic fields at different frequencies in non-overlapping frequency ranges; for example, the MWD tool 236 may be configured to transmit at a frequency between 10 and 100 Hz and the PZiG tool 240 may be configured to transmit at a frequency in the kHz range, such as around 1.64 kHz. When transmitting in this manner, the EM field detector 136 of the wireline tool 120 may simultaneously receive the two electromagnetic field transmissions.

According to yet another embodiment, the MWD tool 236 may include another EM field emitter other than in a PZiG tool 240 (e.g. such other EM field emitter may be present in another type of service tool), and such other EM field emitter may be used to transmit an EM field carrier wave which is detectable by the wireline tool 120.

According to yet another embodiment, the system may be configured to send command instructions for operating the bottom hole assembly from surface to the wireline tool 120 in the producer well, which then transmits those command instructions wirelessly to the bottom hole assembly in the injector well. The wireline tool 120 receives data from surface via the wireline, encodes the received data into an electromagnetic signal, then generates an electromagnetic field including the electromagnetic signal. An EM filed detector in the bottom hole assembly receives the electromagnetic field and electronic circuitry decodes the electromagnetic signal to obtain the data.

There are several families of commands that may be sent from the wireline tool to the bottom hole assembly, namely:

1. Commands to Change Telemetry Parameters

With this first family of commands, the command is for changing the telemetry parameters such as modulation type (FSK, PSK, . . . ), carrier frequency, signal level (current, voltage), in order to improve the telemetry performances.

2. Commands to Change Measurement Types

This second family of commands requests the BHA to make specific measurements, such as initiating a survey measurement as described above. Other measurements (vibration, rpm, resistivity, gamma, etc.) may be initiated with specific measurement parameters being requested such as the sampling frequency to be used or the sensors to be used. The command may request the BHA to either transmit the measured data to surface or/and record in memory.

3. Commands to Change Drilling Parameters

In this family of commands, the command changes the drilling behavior of the BHA. This would be of particular interest if a rotary steerable system is present in the BHA. The command includes instruction to cause the BHA to change the inclination or azimuth of the rotary steerable system to drill up, down, left or right. Upon receipt of the command, the rotary steerable system will change the angle of the bit to drill in the desired direction.

While particular embodiments have been described in this description, it is to be understood that other embodiments are possible and that the disclosure is not limited to the described embodiments and instead are defined by the claims.

What is claimed is:

1. A method for conducting survey measurements in a ranging operation between a first well and a second well, comprising:
    deploying a wireline tool in the first well, the wireline tool including an electromagnetic field emitter having at least one solenoid, the field emitter communicatively and electrically coupled to surface equipment via a wireline cable:
    deploying a drill string in the second well, the drill string including a drill bit and a measurement while drilling tool having a magnetic field sensor:
    causing the electromagnetic field emitter to generate a direct current (DC) electromagnetic field in the first well;

causing the measurement while drilling tool to scan for and detect electromagnetic field values in the second well from the DC electromagnetic field generated in the first well: and automatically initiating the survey measurements of the DC electromagnetic field generated in the first well for the ranging operation in the second well when a magnitude of the DC electromagnetic field values measured in the second well meets a trigger threshold without receiving a downlink command from surface.

2. The method of claim 1 wherein said generating the DC electromagnetic field comprises generating a positive polarity DC electromagnetic field and the automatic initiation of survey measurements occurs when the detected electromagnetic field values meet an upper trigger threshold having a positive value that is met when a positive polarity DC magnetic field amplitude is equal to or greater than the upper trigger threshold.

3. The method of claim 1 wherein said generating the DC electromagnetic field comprises generating a negative polarity DC electromagnetic field and the automatic initiation of survey measurements occurs when the detected electromagnetic field values meet a lower trigger threshold having a negative value that is met when a negative polarity DC electromagnetic field amplitude is equal to or below the lower trigger threshold.

4. The method of claim 1 wherein said generating the DC electromagnetic field comprises generating positive and negative polarity DC electromagnetic fields and the automatic initiation of survey measurements occurs when the detected electromagnetic field values meet the trigger threshold comprising an upper trigger threshold having a positive value that is met when a positive polarity DC electromagnetic field amplitude is equal to or greater than the upper trigger threshold and a lower trigger threshold having a negative value that is met when a negative polarity DC electromagnetic field amplitude is equal to or below the lower trigger threshold.

5. The method of claim 4 wherein the electromagnetic field emitter includes a pair of first and second spaced apart solenoids and wherein said generating the DC electromagnetic field comprises using the first and second solenoids to generate first and second generating two electromagnetic fields.

6. The method of claim 4 further comprising determining an ambient electromagnetic field value from the scanning for the electromagnetic field, and selecting the upper trigger threshold to have a value that is greater than the ambient electromagnetic field value and selecting the lower trigger threshold to have a value that is less than the ambient electromagnetic field value.

7. The method of claim 1 wherein said generating the DC electromagnetic field comprises generating the DC electromagnetic field of different polarities, the at least one characteristic of the DC electromagnetic field is polarity pattern, and the automatic initiation of survey measurements occurs when a defined pattern of the DC electromagnetic field polarities is detected.

8. The method of claim 1 wherein the first well is a producer well in a steam assisted gravity drainage (SAGD) well pair, and the second well is an injector well in the SAGD well pair.

9. An apparatus for conducting survey measurements in a ranging operation between a first well and a second well, comprising:
a wireline tool deployed in the first well, the wireline tool including an electromagnetic (EM) field emitter having at least one solenoid, the field emitter communicatively and electrically coupled to surface equipment via a wireline cable;

a drill string deployed in the second well, the drill string including a drill bit and a measurement while drilling tool having a magnetic field sensor; and electronic circuitry in the second well and communicative with the magnetic field sensor and having a processor and a memory with a synchronization program encoded thereon that is executable by the processor to perform a method comprising: scanning for direct current (DC) electromagnetic field generated by the EM field emitter, and when the DC electromagnetic field is detected and has a value that meets a defined trigger threshold, automatically initiating the survey measurements for the ranging operation without receiving a downlink command from surface.

10. The apparatus of claim 9 wherein the EM field detector magnetic field sensor comprises a three-axis flux gate magnetometer.

11. The apparatus of claim 9 wherein the EM field emitter comprises a pair of solenoids spaced apart from each other along the wireline tool.

12. The apparatus of claim 11 wherein the pair of solenoids are each operable to generate positive and negative polarity DC EM fields.

13. A method for conducting survey measurements in a ranging operation between a first well and a second well, comprising:
deploying a wireline tool in the first well, the wireline tool including an electromagnetic field emitter having at least first and second axially spaced solenoids, the field emitter communicatively and electrically coupled to surface equipment via a wireline cable;

deploying a drill string in the second well, the drill string including a drill bit and a measurement while drilling tool having a magnetic field sensor;

causing the magnetic field sensor to measure an ambient magnetic field in the second well when the measurement while drilling tool detects a flow off condition;

energizing the first solenoid to generate a first positive polarity DC electromagnetic field;

automatically initiating first survey measurements of the first positive polarity DC electromagnetic field when a magnetic field measurement of the first positive polarity DC electromagnetic field exceeds an upper threshold based on the measured ambient magnetic field; energizing the first solenoid to generate a first negative polarity DC electromagnetic field;

automatically initiating second survey measurements of the first negative polarity DC electromagnetic field when a magnetic field measurement of the first negative polarity DC electromagnetic field is less than a lower threshold based on the measured ambient magnetic field;

energizing the second solenoid to generate a second positive polarity DC electromagnetic field;

automatically initiating third survey measurements of the second positive polarity DC electromagnetic field when a magnetic field measurement of the second positive polarity DC electromagnetic field exceeds the upper threshold;

energizing the second solenoid to generate a second negative polarity DC electromagnetic field; and automatically initiating fourth survey measurements of the second negative polarity DC electromagnetic field when a magnetic field measurement of the second negative polarity DC electromagnetic field exceeds the lower threshold.

\* \* \* \* \*